(12) United States Patent
Hayashi et al.

(10) Patent No.: US 6,522,625 B1
(45) Date of Patent: Feb. 18, 2003

(54) RADIO COMMUNICATION APPARATUS AND RADIO COMMUNICATION METHOD

(75) Inventors: Masaki Hayashi, Yokosuka (JP); Kazuyuki Miya, Kawasaki (JP); Osamu Kato, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/199,195

(22) Filed: Nov. 25, 1998

(30) Foreign Application Priority Data

Dec. 1, 1997 (JP) .............................................. 9-345820

(51) Int. Cl.[7] .......................... H04J 11/00; H04J 13/00; H04J 13/04
(52) U.S. Cl. ........................ 370/208; 370/337; 370/491; 375/134
(58) Field of Search ................................. 370/203, 208, 370/209, 320, 321, 335, 324, 336, 337, 342, 479, 491, 500, 503, 509, 510, 511, 512, 513, 514, 515; 375/140, 141, 142, 147, 150, 134

(56) References Cited

U.S. PATENT DOCUMENTS 6,144,650 A * 11/2000 Watanabe et al.
6,167,037 A * 12/2000 Higuchi et al.

\* cited by examiner

Primary Examiner—William Luther
(74) Attorney, Agent, or Firm—Greenblum & Bernstein, P.L.C.

(57) ABSTRACT

Symbol 102 that is spread with the only short spreading code and inserted in synchronism with a long spreading code is specified by detecting the correlation with only the short spreading code. Next, another short spreading code indicative of a timing of reverse and forward link switching is specified, where the short spreading code is multiplexed at the same position as that of the detected symbol. The detection of the symbols spread with only these spreading codes enables to acquire synchronization of the long spreading code, synchronization of switching of reverse and forward links, and synchronization of a transmission frame. It is thereby possible to reduce synchronization acquisition time for the long spreading and an easy planning of base station locations without decreasing the frequency utilization efficiency.

11 Claims, 11 Drawing Sheets

| SUROT NUMBER | PILOT PATTERN |
|---|---|
| 0 | 00 00 00 00 |
| 2 | 00 00 01 01 |
| 4 | 00 00 10 10 |
| 6 | 00 00 11 11 |

FIG. 9A

| SUROT NUMBER | PILOT PATTERN |
|---|---|
| 0 | 00 00 00 00 |
| 2 | 00 00 00 11 |
| 4 | 00 00 01 10 |
| 6 | 00 00 11 00 |
| 8 | 00 00 10 10 |
| 10 | 00 00 10 01 |
| 12 | 00 00 01 01 |
| 14 | 00 00 11 11 |

FIG. 9B

| SUROT NUMBER | PILOT PATTERN |
|---|---|
| 0 | 00 00 00 00 |
| 2 | 00 00 11 00 |
| 4 | 00 00 01 00 |
| 6 | 00 00 10 00 |
| 8 | 00 00 01 01 |
| 10 | 00 00 10 01 |
| 12 | 00 00 00 01 |
| 14 | 00 00 11 01 |
| 16 | 00 00 00 10 |
| 18 | 00 00 11 10 |
| 20 | 00 00 01 10 |
| 22 | 00 00 10 10 |
| 24 | 00 00 01 11 |
| 26 | 00 00 10 11 |
| 28 | 00 00 00 11 |
| 30 | 00 00 11 11 |

FIG. 9C

| | FRAME | | | | | | | |
|---|---|---|---|---|---|---|---|---|
| SLOT | Slot 0 | | Slot 2 | | Slot 4 | | Slot 6 | |
| CODE PATTERN #1 | SC1 | | SC1 | | SC1 | | SC1 | |
| CODE PATTERN #2 | SC1 | | SC2 | | SC1 | | SC2 | |
| CODE PATTERN #3 | SC1 | | SC2 | | SC1 | | SC3 | |
| CODE PATTERN #4 | SC1 | | SC2 | | SC3 | | SC1 | |

FIG. 10A

| CODE PATTERN NUMBER | SWITCHING TIMING |
|---|---|
| CODE PATTERN NUMBER #1 | SYMBOL JUST BEFORE |
| CODE PATTERN NUMBER #2 | THE THIRD SYMBOL BEFORE |
| CODE PATTERN NUMBER #3 | THE FOURTH SYMBOL BEFORE |
| CODE PATTERN NUMBER #4 | THE SIXTH SYMBOL BEFORE |
| ⋮ | ⋮ |

FIG. 10B

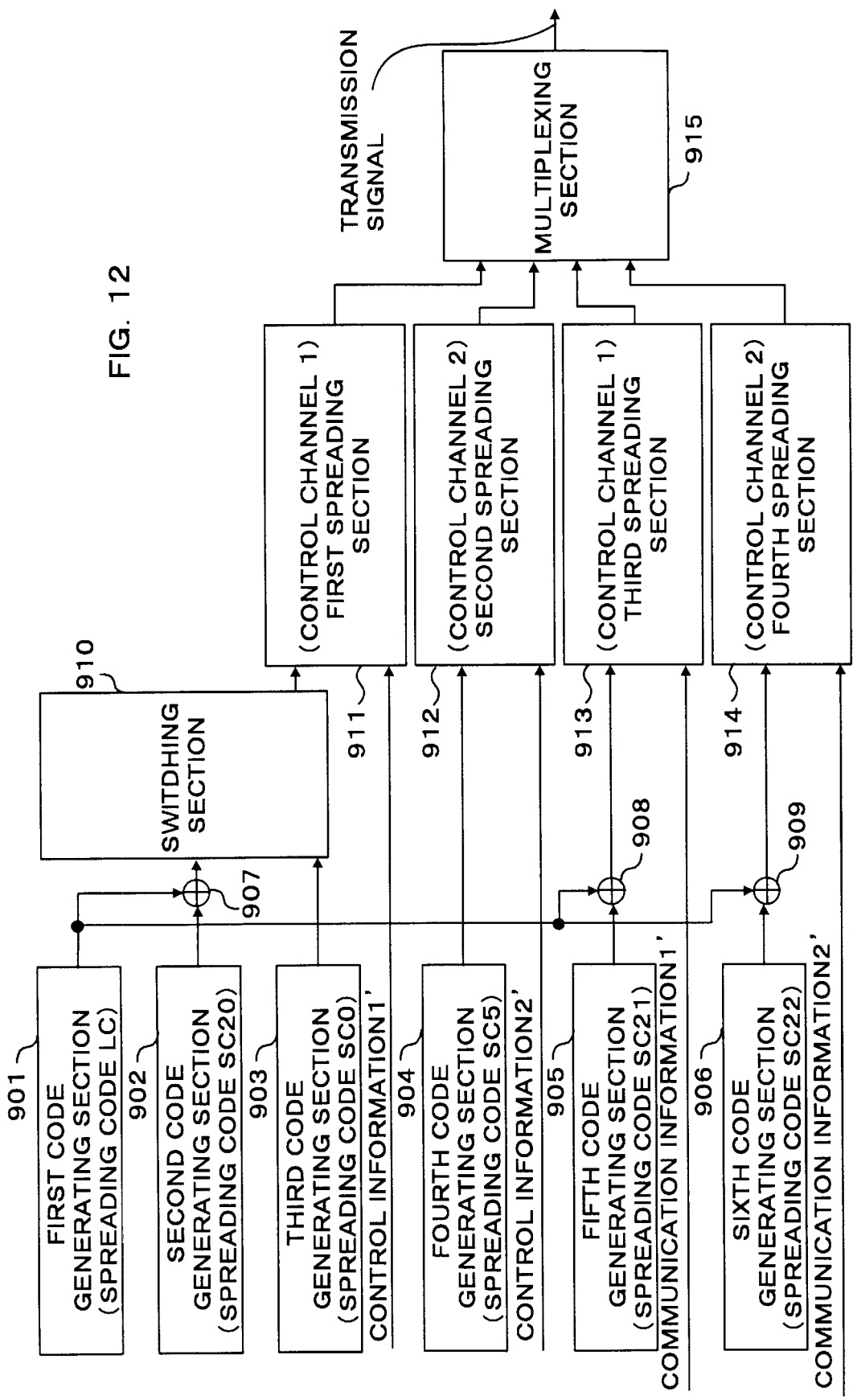

RADIO COMMUNICATION APPARATUS AND RADIO COMMUNICATION METHOD

BACKGROUND OF THE INVENTION

1. Filed of the Invention

The present invention relates to a radio communication apparatus and radio communication method in a CDMA/TDD radio communication system in which multiple accesses are performed by a spread spectrum communication where information is spread with a spreading code to transmit in a spread frequency band and communications in the same radio frequency are performed alternately via a reverse link and a forward link in time division.

2. Description of the Related Art

Conventionally, as a radio communication system using a CDMA (Code Division Multiple Access) system, US Standard IS-95 is known. As a duplex system in IS-95, FDD (Frequency Division Duplex) is used. As the duplex system, TDD (Time Division Duplex) is also known. In the TDD system, transmissions and receptions are performed in the same frequency band, called a Ping-Pong system, where communications in the same radio frequency are performed alternately via a reverse link and a forward link in time division.

A multiple access system is a link connection system where a plurality of stations perform communications concurrently in the same frequency band. The CDMA technique is used to perform multiple connections by spread spectrum communications where an information signal is spread with a spreading code to transmit in a spread frequency band.

A direct sequence spread spectrum system is a system where an information signal is multiplied by a spreading code in the spreading. In a direct sequence CDMA, a plurality of communication links share the same frequency, thereby resulting in a problem (near-far problem) that it is necessary to acquire the same communication level at each reception side, which should be solved to achieve a CDMA transmission system.

The near-far problem is severer in receptions of a base station for receiving radio waves concurrently from a plurality of mobile stations located at different distances from the base station. Therefore, it is mandatory at mobile station sides to perform a transmission power control corresponding to a state of each transmission path.

FIG. 1 is a schematic diagram illustrating base stations and a mobile station in the base stations controlled communication areas. FIG. 1 illustrates a case where three base stations are present.

In FIG. 1, the communication area of base station 1 is cell 5, the communication area of base station 2 is cell 6, and the communication area of base station 3 is cell 7. The scales and forms of communication areas vary depending on propagation environments.

Mobile station 4 acquires synchronization of spreading codes transmitted from base stations 1 to 3 when turned on. First, mobile station 4 extracts signals of base stations 1 to 3 from signals including signals of base stations 1 to 3, and starts the synchronization acquisition of the spreading codes.

The initial synchronization acquisition is explained with reference to FIG. 2. FIG. 2 is a timing diagram of each cell frame and a long spreading code. In IS-95, base stations 1 to 3 are synchronous to each other and the same basic timing is applied in transmission frames of each of cells 5 to 7. As spreading codes, a short spreading code and a long spreading code are multiplexed to be used. The short spreading code is, for example, 64 chips, and the long spreading code is, for example, 40,960 chips.

In a forward link, a sort of long spreading code is common and one in the system. Each of cells 5 to 7 uses the sort of long spreading code by shifting a phase (differing a timing of a head of the code). Generally, the timings of basic frames k, k+1 and k+2 of cells 5 to 7 are not conformed to the timing of the long spreading code. Accordingly, each cell is identified by the phase shift variation (difference).

The system includes some physical channels, where timings of communication channel frames (communication frames) and timings of control channel frames (control frames) except SYNC channel frames (synchronism frames) are conformed to the basic frames k, k+1 and k+2.

Only the timings of SYNC channel frames (SYNC frames) k', k'+1 and k'+2 are not conformed to the basic frames k, k+1 and k+2 but conformed to the timing of the long spreading code.

A sort of short spreading code used in the SYNC channel is common and one in the system. Mobile station 4 detects the correlation of a received signal with a spreading code in which the long spreading code and the short spreading code of the SYNC channel are multiplied. The correlation detection is performed by varying the timing gradually until the correlation level exceeds the threshold value.

In the above manner, mobile station 4 detects the timing of the long spreading code from either of cells 5 to 7. Since the timings of SYNC channel frames k', k'+1 and k'+2 are conformed to the timing of the long spreading code, it is possible to demodulate and decode SYNC channel signals according to the timing of the long spreading code.

The SYNC channel informs a difference of timings between basic frames k, k+1, k+2 and the long spreading code of the current cell (cell 5 in the configuration in FIG. 1) and a difference of timings between basic frames k, k+1, k+2 and the long spreading code of the neighboring cell (cell 6 or 7 in the configuration in FIG. 1). Accordingly, mobile station 4 is capable of acquiring the timing of basic frames k, k+1 and k+2, thereby allows mobile station 4 to demodulate and decode different control channel signal.

Since the SYNC channel also informs the difference of timings between the long spreading code of the neighboring cell and basic frames, mobile station 4 is capable of demodulating and decoding different control channels signals of neighboring cell 6 or 7 and of comparing a reception level of cell 5 which SYNC channel is already detected with a reception level of neighboring cell 6 or 7. Then mobile station 4 selects a control channel of another cell with higher reception level to receive.

However, in the conventional initial synchronization method described above, when it is assumed that the long spreading code length is, for example, 32,768 chips (26.667 [ms]), it is necessary to repeat the correlation detection with respect to 32,768 timings (more than if oversampling is considered). In this case, it takes 6.82 [s], as shown below, to repeat detecting the correlation in short spreading code length (for example, 256 chips) 32,678 times (1/1.2288 [MHz])×(256/2)×32768=6.82 [s]. In the case of calculating an average, it takes a half of the time, which is 3~4 [s]. Actually, the processing time including call connection processing is regulated maximum 15 [s], which suggests that it takes relatively a long time to detect the correlation of the long spreading code.

In addition, the transmission power of the SYNC channel is a half that of the communication channel. When it is assumed that the number of concurrently connected communication channels in a cell is, for example 20, one-fortieth of the frequency utilization efficiency is decreased. Accordingly, the frequency utilization efficiency is decreased due to the SYNC channel.

In FDD, frequency bands between a reverse link and a forward link are different and communications in each link are continuously performed. On the contrary, in TDD, communications in the same frequency band are alternately performed in a reverse link and a forward link. In other words, in the case of receiving forward link signals in mobile stations, an area where a signal to be received is present and an area where a signal to be received is not present are switched. Before a mobile station acquires the synchronization with a base station, a switching timing of the reverse link and the forward link is unknown to the mobile station. In other words, in TDD, a mobile station has not acquired the switching timing of the reverse and forward link.

Further, in the case where the switching timing of the reverse link and forward link is synchronized with the frame timing, the timings of the long spreading code are limited by some of switching timings of the reverse and forward link in the frames. In other words, in TDD, in the case of synchronizing the switching timing of the reverse and forward link with the frame timing, the long spreading code timings are limited. Such limitation brings a difficult planning of base station locations.

SUMMARY OF THE INVENTION

An object of the present invention is to provide a radio communication apparatus and a radio communication method in a CDMA/TDD radio communication system, that are capable of reducing a synchronization acquisition time of a long spreading code without reducing a frequency utilization efficiency and of facilitating an easy planning of base station locations.

This object is achieved by detecting the correlation with only a short spreading code common in the system to detect symbols with the high correlation value, where the detected symbols are spread with only the short spreading code and provided in relation with a period of the long spreading code, and by detecting another short spreading code indicative of the switching timing of reverse and forward link, which is multiplexed in the same position in the detected symbols, so as to acquire the synchronization of the long spreading code and the synchronization of the forward and reverse link switching, and the synchronization of transmission frames.

BRIEF DESCRIPTION OF THE DRAWINGS

FIG. 9A is a diagram illustrating a pattern configuration in the case where a slot that is one-eighth of one frame is assigned to a forward link in a phase pattern of pilot symbols of control channel to explain an initial synchronization in the CDMA/TDD communication system according to the third embodiment of the present invention;

FIG. 9B is a diagram illustrating a pattern configuration in the case where a slot that is one-sixteenth of one frame is assigned to a forward link;

FIG. 9C is a diagram illustrating a pattern configuration in the case where a slot that is one-thirty second of one frame is assigned to a forward link;

FIG. 10A is a diagram illustrating another symbol configuration for slots of control channel to explain an initial synchronization method in the CDMA/TDD radio communication system according to the second embodiment of the present invention;

FIG. 10B is a diagram illustrating a table in which code patterns and a head of a long spreading code are described;

FIG. 12 is a block diagram of an initial synchronization section in a transmission and reception apparatus in the CDMA/TDD radio communication system according to the sixth embodiment of the present invention.

DETAILED DESCRIPTION OF THE PREFERRED EMBODIMENT

The explanation below describes about the embodiments of a radio communication apparatus and a radio communication method in a CDMA/TDD radio communication system of the present invention with reference to attached drawings.

(First Embodiment)

Figure 3:
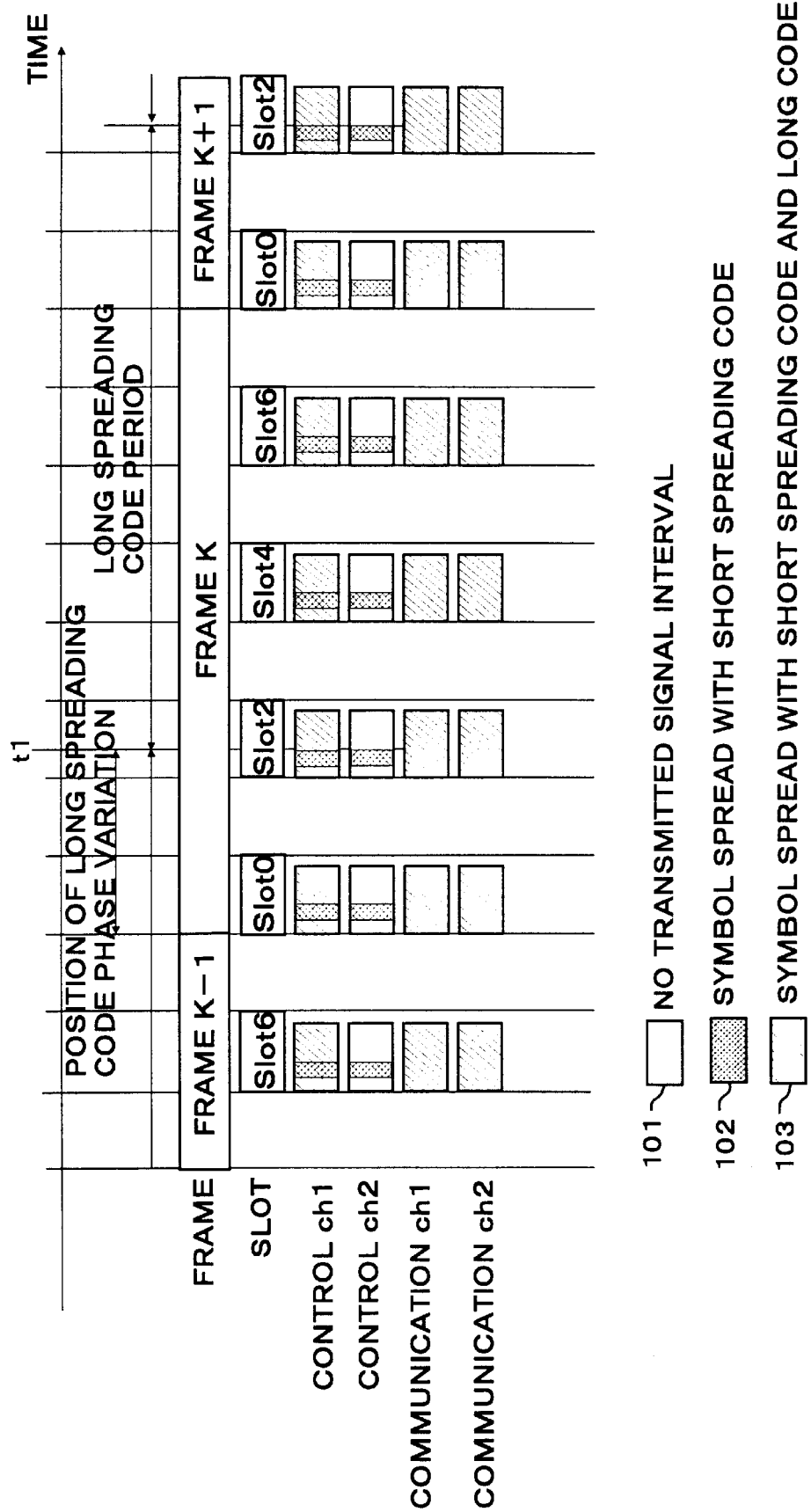
FIG. 3 is a diagram illustrating a symbol configuration for slots of control channels to explain an initial synchronization method in the CDMA/TDD radio communication system according to the first embodiment of the present invention.

FIG. 3 illustrates a symbol configuration diagram for slots of control channel to explain an initial synchronization method in a CDMA/TDD radio communication system according to the first embodiment of the present invention. In addition, a configuration of the CDMA/TDD radio communication system is explained with reference to FIG. 1 where the conventional configuration is explained.

Figure 1:
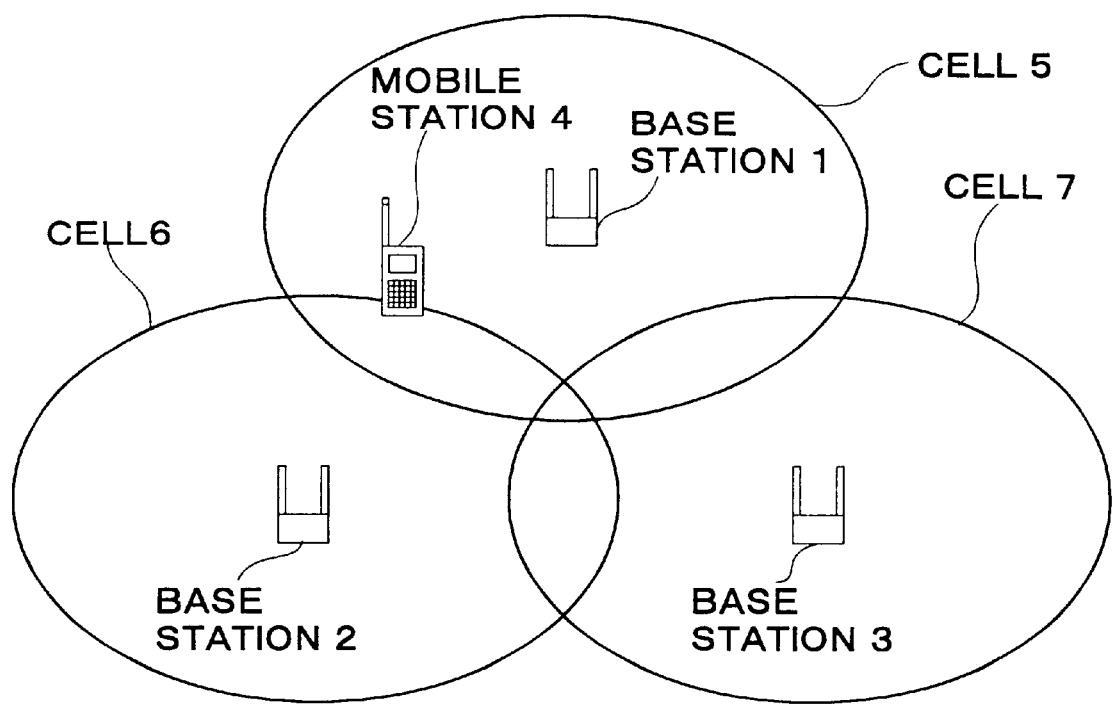
FIG. 1 is a schematic diagram illustrating base stations and a mobile station in base station controlled communication areas.
Figure 2:
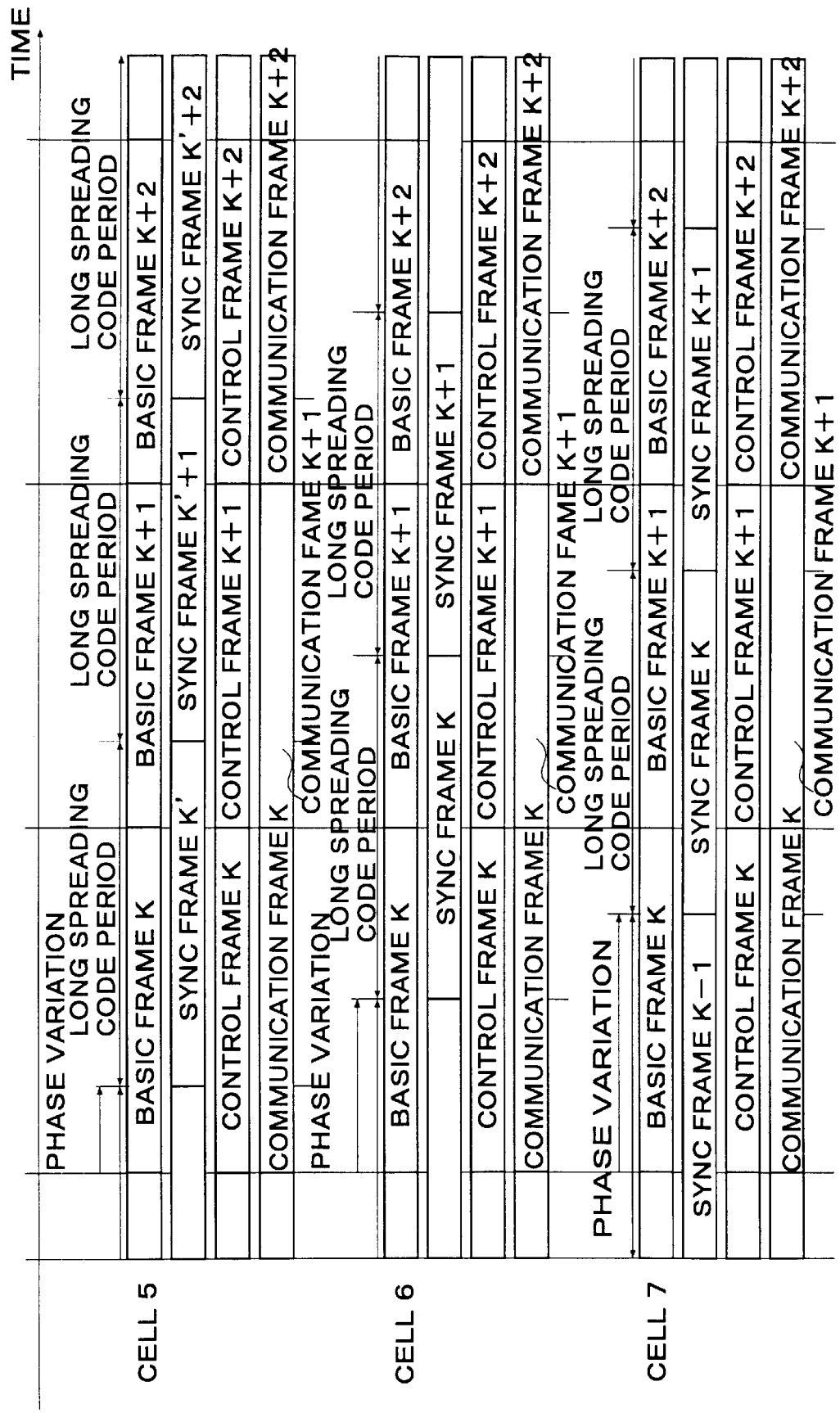
FIG. 2 is a timing diagram of each cell frame and a long spreading code in a conventional initial synchronization method in a CDMA/TDD radio communication system.

That is, in FIG. 1, the communication area of base station 1 is cell 5, the communication area of base station 2 is cell 6, and the communication area of base station 3 is cell 7. The scales and forms of communication areas vary depending on propagation environments.

Mobile station 4 acquires synchronization of spreading codes transmitted from base stations 1 to 3 when turned on. First, mobile station 4 extracts signals of base stations 1 to 3 from signals including signals of base stations 1 to 3, and starts the synchronization acquisition of spreading codes.

Figure 4:
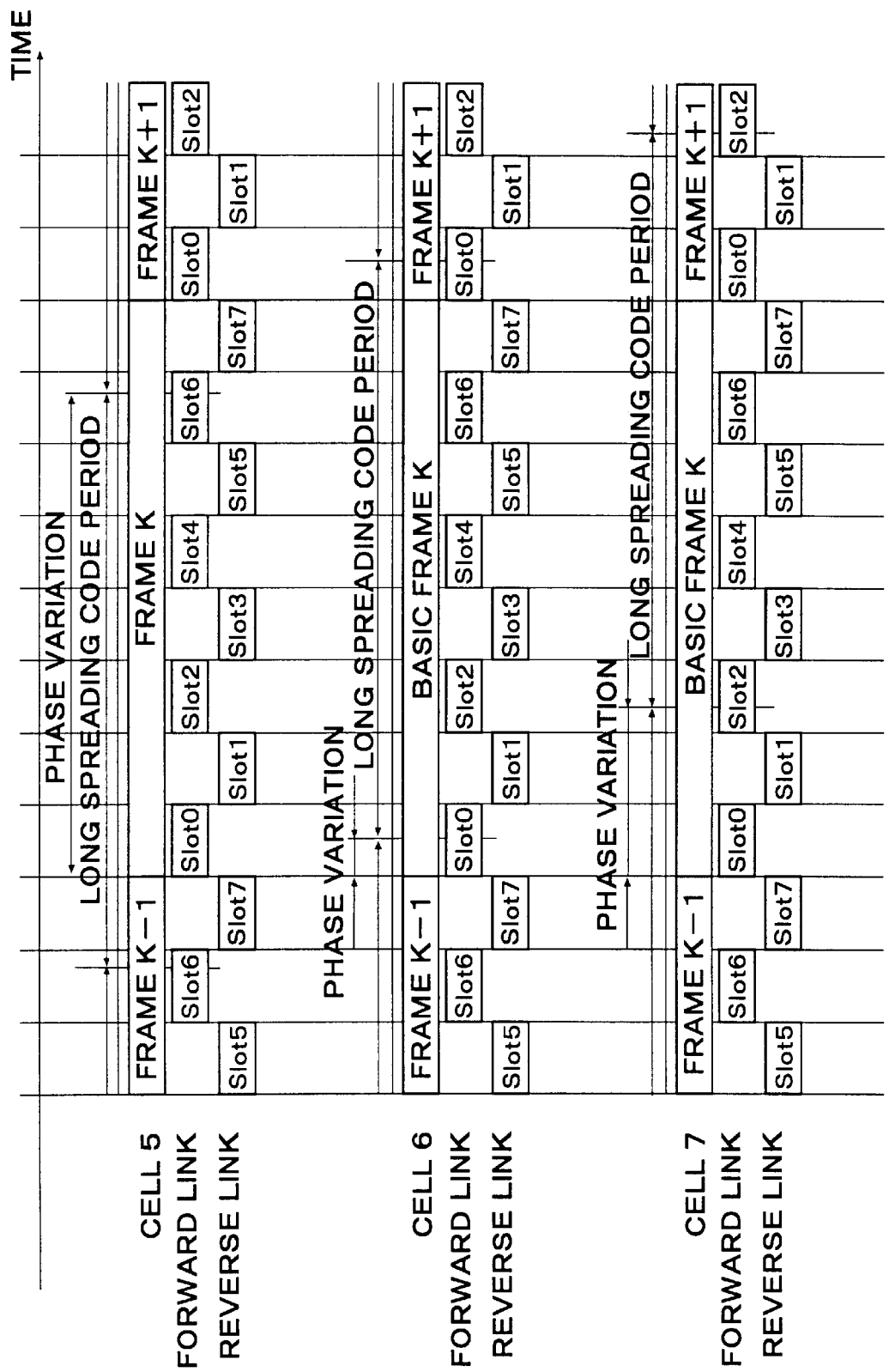
FIG. 4 is a timing diagram for frames and slots of each cell and a long spreading code in an initial synchronization method in the first embodiment.

The initial synchronization acquisition is explained with reference to FIG. 4. FIG. 4 is a timing diagram of each cell frame and a long spreading code.

In FIG. 4, a basic frame k is divided to eight slots that are Slots 0 to 7. Due to TDD, forward links and reverse links are repeated alternately. It is assumed that even number slots (Slot 0, Slot 2, Slot 4 and Slot 6) are forward links and odd number slots (Slot 1, Slot 3, Slot 5 and Slot 7) are reverse links.

Base stations 901 to 903 are synchronous to each other and cells 905 to 910 have the same timings of transmission frame. Accordingly, the timings of slots, i.e., Slots 0 to Slots 7 (switching timing of reverse link and forward link) are conformed in any cell of cells 5 to 7.

A short spreading code and a long spreading code are multiplied to use as a spreading code. In the forward link, one sort of the long spreading code is used commonly in the system. Each of cells 5 to 7 uses the sort of the long spreading code by shifting a phase (differing a timing of a head of the code). Accordingly, each of cells 5 to 7 are identified by the phase shift variation. Generally, the timings of basic frames k−1, k and k+1 of cells 5 to 7 are not conformed to the timing of the long spreading code.

In an example of channel configuration of the forward link in FIG. 3, the number of control channels (control ch) is four and the number of communication channel (communication ch) is six. In addition, since a guard time is provided, a signal length of each channel is a little shorter than a slot length. in each Slot 0 to Slot 7. The guard time is provided to prevent forward link signals and reverse link signals from being overlapped by delayed versions. In addition, in symbols indicating control channels and communication channels, which are indicated by rectangles, white part 101 represents an interval in which signals are not transmitted, whole oblique line part 102 represents symbols that are spread with only the short spreading code, and half oblique line part 103 represents symbols that are spread with the code in which the short spreading code and the long spreading code are multiplied.

In communication channel signal, all of symbols are spread with the code in which the short spreading code and the long spreading code are multiplied. In control channel signal 1, some of symbols are spread with only the short spreading code, and the rest of symbols are spread with the code in which the short spreading code and the long spreading code are multiplied. In control channel signal 2, a symbol in each slot is spread with only the short spreading code, and at the rest interval in the slot, symbols are not transmitted. The long spreading code is common, and the short spreading codes are different between each channel.

FIG. 3 illustrates an example in which the head of the long spreading code is shifted to the middle of Slot 2, which is assumed to be jth symbol at time t1. In control channel signal 1, a symbol just before the head of the long spreading code (j−1th symbol) in Slot 2 is spread with only the short spreading code. Further, j−1th symbols in Slot 0, Slot 4 and Slot 6 of control channel signal 1 are also spread with only the short spreading code.

Figure 5:
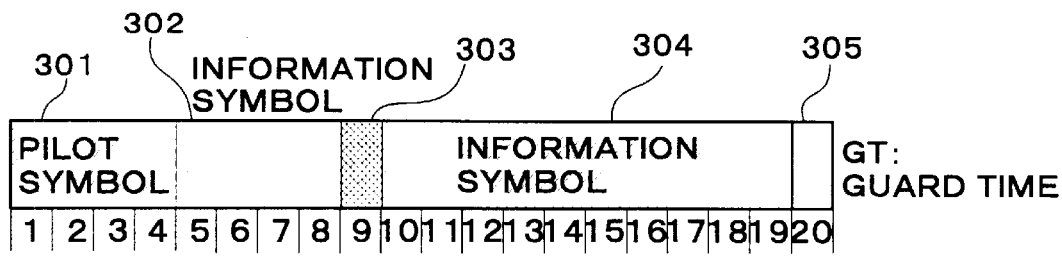
FIG. 5 is a diagram illustrating a symbol configuration for slots of control channel 1 in the initial synchronization method in the first embodiment.

FIG. 5 is a diagram illustrating a configuration of symbols in the slot of control channel signal 1 illustrated in FIG. 3. This case illustrates an example where one slot is composed of 20 symbols. 4 symbols of 301 from the first symbol to the fourth symbol are pilot symbols PL. In 15 symbols from the fifth symbol to the nineteenth symbol, except the kth symbol (in this case, k=9) 303, 14 symbols of symbols 302 from the fifth symbol to the eighth symbol and symbols 304 from the tenth symbol to the nineteenth symbol are information symbols INFO. The twentieth symbol 305 is the guard time where a signal is not transmitted.

PL301, INFO302 and INFO304 are spread with the code in which the short spreading code and the long spreading code are multiplied. Symbol 303 is spread with only the short spreading code. The short spreading code used in control channel signal 1 is a predetermined common code in the system. The common short spreading code is referred to as SC0.

The phase shift variation of the long spreading code is set so that the head of the long spreading code is synchronized with one of 15 symbols from the sixth symbol to twentieth symbol, while not synchronized with pilot symbols (from the first symbol to the fourth symbol) and a symbol just after the pilot symbol (the fifth symbol), in one slot among forward link slots (Slot 0, Slot 2, Slot 4 and Slot 6). In this case, the number of the phase shift variations is 60.

Figure 6:
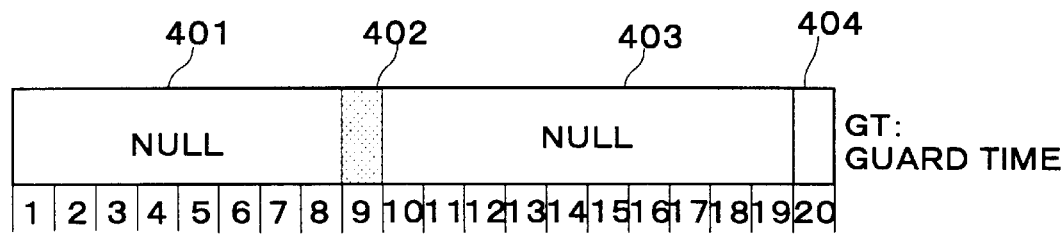
FIG. 6 is a diagram illustrating a symbol configuration for slots of control channel 2 in the initial synchronization method in the first embodiment.

FIG. 6 is a diagram illustrating a configuration of symbols in a slot of control channel signal 2 illustrated in FIG. 3. FIG. 6 illustrates an example where one slot is composed of 20 symbols in the same manner as FIG. 5. In 19 symbols from the first symbol to the nineteenth symbol, 18 symbols of symbols 401 from the first symbol to the eighth symbol and symbols 403 from the tenth symbol to the nineteenth symbol are NULL symbols, except for kth symbol (in this case, k=9). The twentieth symbol 404 is the guard time GT.

In NULL401, NULL403 and GT404, signals are not transmitted. Symbol 402 is spread with only the short spreading code. As a value of k, 15 integer numbers from 5 to 19 are available. Accordingly, as the short spreading code used in control channel 2, 15 sorts of the code are prepared. It is assumed that these 15 shorts of spreading codes are SC1 to SC 15. According to the value of k, SCk−4 is selected from 15 sorts of the codes to use. For example, in FIG. 6 SC5 is used because of k=9.

Mobile station 4 does not acquire synchronization with base stations 1 to 3 when turned on. Accordingly, mobile station 4 has not obtained the timing of long spreading code, the slot timing (switching timing of reverse link and forward link), and the frame timing. The following processing is performed to detect the timing of long spreading code, the slot timing, and the frame timing.

As the first step, control channel signal are despread with the short spreading code SC0. In this case, symbols with high correlation value appear each 40 symbols (each 2 slots). Accordingly, it is suggested that candidates of the head of the long spreading code are symbols just after the 4 symbols with the high correlation value appearing in one frame length (160 symbols)

Next, as the second step, the symbols having the high correlation value with short spreading code SC0 are despread with each of the short spreading codes SC1 to SC15. In this despreading processing, correlation value with one code is detected high. According to the number (SC1 to SC15) of code with the high correlation value, the value of k (5 to 9) is determined. In this manner, it is decided the symbol spread with the short spreading code is the kth symbol in the slot. In other words, the switching timing of forward link and reverse link is decided. Thereby, it is possible to despread the symbol other than the symbol despread with the short code only.

Next, as the second step, as the third step, each candidate symbol for the head position of the long spreading code is despread in the forward link interval with the code in which the short spreading code and the long spreading code are multiplied. In this manner, it is decided that which one of four candidates is the head of the long spreading code.

Finally, as the fourth step, the short spreading code is multiplied by the long spreading code LC at the timing of the long spreading LC according to exclusive-OR to obtain the multiplied code, with which the despreading processing is performed to received signals. Candidates of the head of the long spreading code are decoded to judge the frame timing.

According to the above processing, mobile station 4 obtains the timing of the long spreading code, the switching timing, and frame timing of reverse and forward link. That is, only four candidates are enough at the first step to obtain the timing of the long spreading code, thereby allowing largely reducing of the synchronization acquisition time for the long spreading code.

In addition, since two symbols in control channel signal 1 and control channel signal 2 of one slot are used in the synchronization acquisition for the timing of the long spreading code and the slot timing, the ratio of decreasing of the utilization efficiency for the synchronization acquisition is reduced to 1/10 as compared to the case where all of 20 symbols are used in the SYNC channel for the frame synchronization.

In addition, according to the second step, the switching timing of reverse and forward link is obtained. Further, since control channel signal 2 is provided, 15 symbols from the sixth symbol to the twentieth symbol in a slot are available as a head of the long spreading code.

As described above, according to the first embodiment, in the CDMA/TDD radio communication system in which the short spreading code and the long spreading code are multiplied to use, symbols spread with only the short spreading code are provided at a certain interval, and the symbols spread with only the short spreading code are detected. By this processing, the acquisitions of synchronization for the long spreading code and the synchronization of switching reverse and forward link are performed, thereby allowing reducing of the synchronization acquisition time.

In addition, the above embodiment describes about the case where the number of symbols spread with only the short spreading code each slot is one, however it may be provided a plurality of symbols spread with only the short spreading code each slot.

Further, the above embodiment describes about the case where the symbol spread with only the short spreading code is a symbol just before the head of the long spreading code, however it is not necessary to always prepare the symbol just before the head of the long spreading code when the symbol spread with only the short spreading code is related with the timing of the long spreading code in advance.

In addition, the above embodiment describes about the case where no signals are transmitted other than the kth symbol in control channel signal 2, however it is preferable that other symbol information is transmitted in the same manner as control channel signal 1.

(Second Embodiment)

Figure 7:
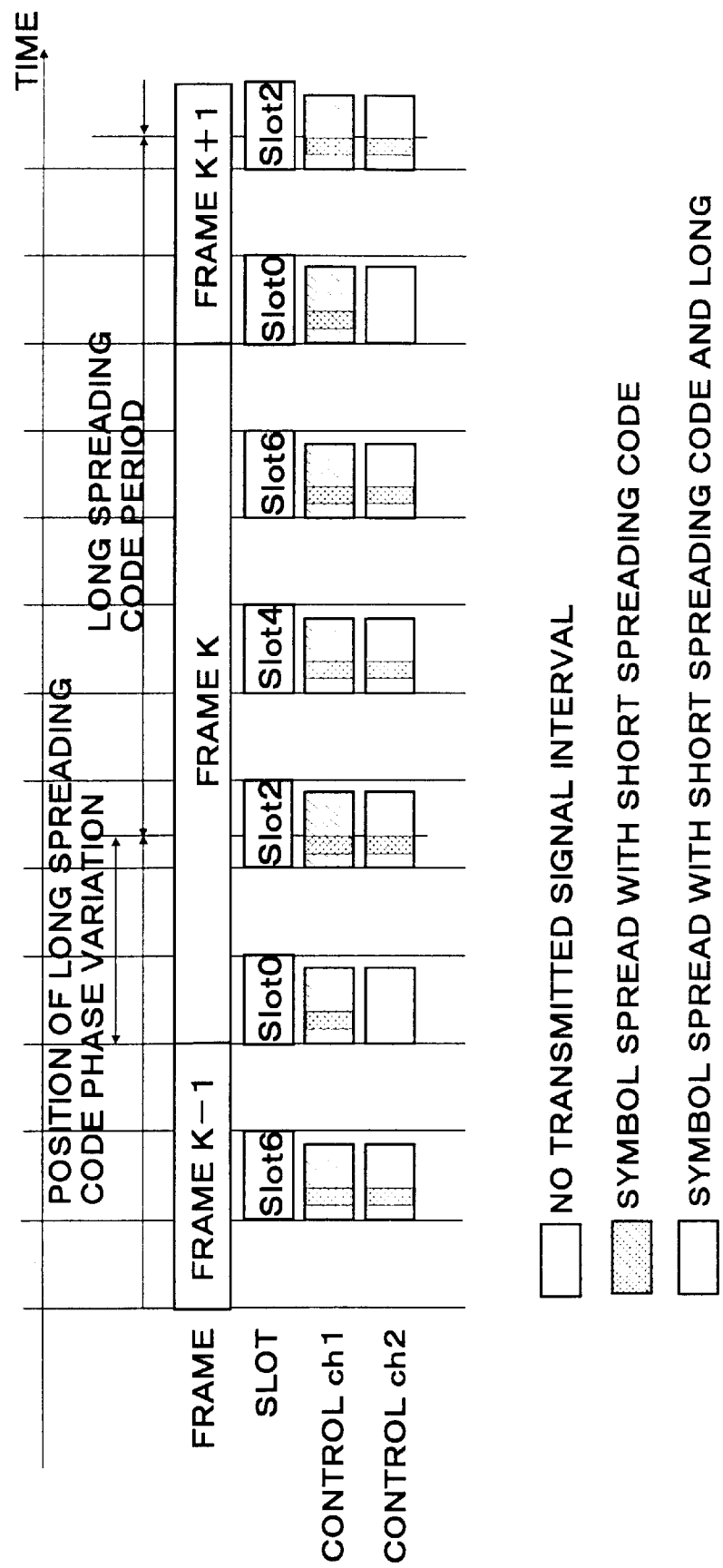
FIG. 7 is a diagram illustrating a symbol configuration for slots of control channel to explain an initial synchronization method in the CDMA/TDD radio communication system according to the second embodiment of the present invention.

FIG. 7 is a diagram illustrating a symbol configuration for slots of control channels to explain an initial synchronization method in the CDMA/TDD radio communication system according to the second embodiment of the present invention. In addition, sections in the second embodiment illustrated in FIG. 7 corresponding to the sections in the first embodiment illustrated in FIG. 3 are assigned the same symbols as the first embodiment to omit the explanation.

According to the initial synchronization method described in the first embodiment, mobile station 4 acquires the synchronization for the long spreading code and the synchronization for the switching timing of reverse and forward link. However, at this time, mobile station 4 has not recognized the slot number and has not acquired the transmission frame synchronization.

The second embodiment describes about a method to further acquire the transmission frame synchronization by presence and absence of symbols spread with only the short spreading code and a phase in an in-phase component-quadrature component plane.

The first description is about the method to acquire the transmission frame synchronization by presence and absence of symbols spread with only the short spreading code. FIG. 7 is a diagram illustrating a frame configuration of control channel signal 1 and control channel signal 2. The symbol configuration of slots in control channel signal 1 is the same as that explained in the first embodiment illustrated in FIG. 5. In control channel signal 2, no signals are transmitted in Slot 0 as illustrated in FIG. 7.

Mobile station 4 acquires the synchronization for the long spreading code and the synchronization for the switching timing of reverse and forward link according to the initial synchronization method explained in the first embodiment, then searches the slot in which no signals are transmitted in control channel signal 2.

The correlation values with each spreading code SCm (m=1 to 15) that is used in control channel signal 2 are detected, and the slot having not high correlation value is detected to decide Slot 0. The head of the detected slot is thus recognized as the head of the transmission frame because Slot 1 is placed at the head of the slot.

Figure 8:
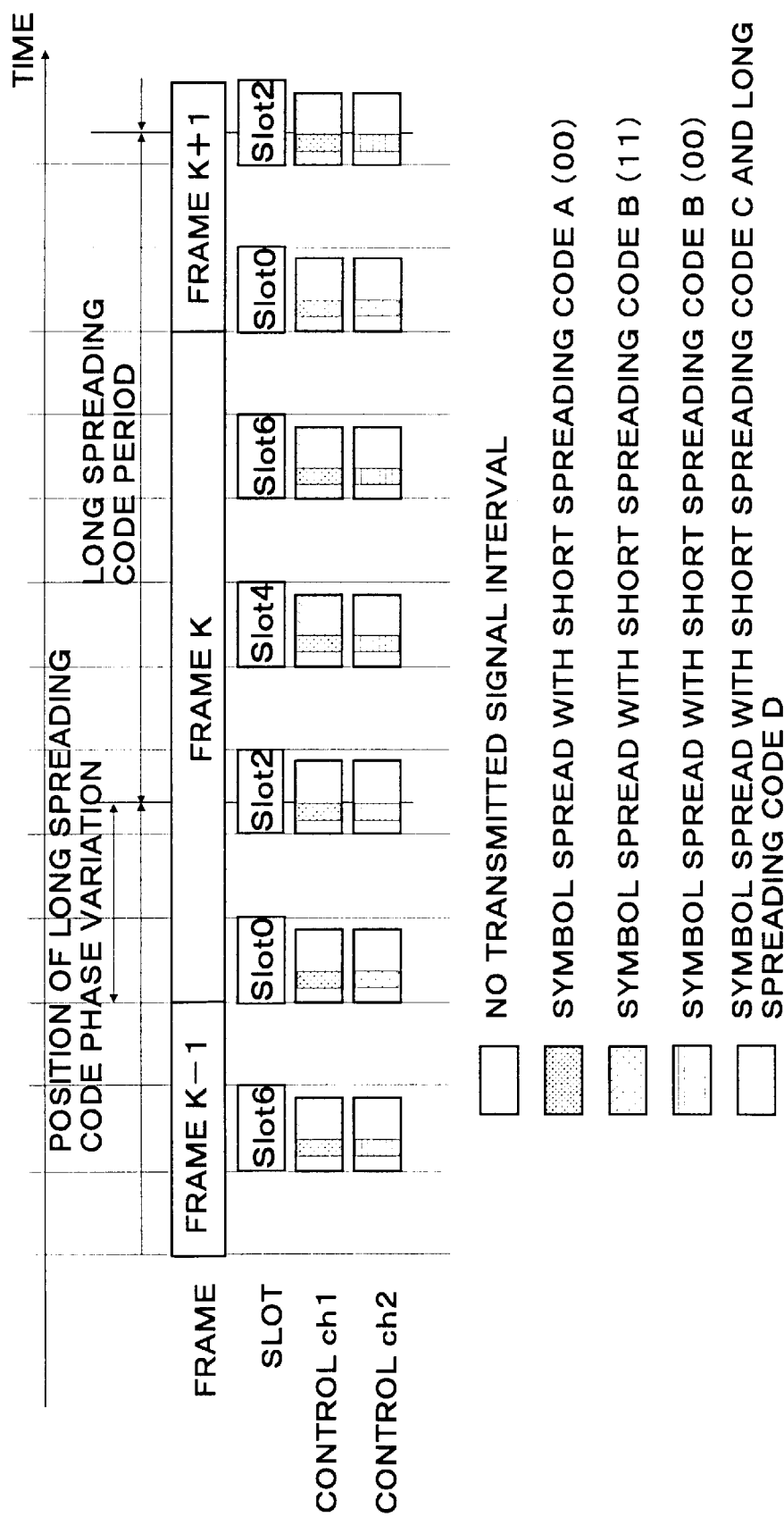
FIG. 8 is a diagram illustrating an another symbol configuration for slots of control channel to explain an initial synchronization of the second embodiment.

The next description is about the method to acquire the transmission frame synchronization by a phase in the in-phase component-quadrature component plane. FIG. 8 is a diagram illustrating another example of frame configurations of control channel signal 1 and control channel signal 2.

Herein, it is assumed that the modulation system is QPSK (Quadrature Phase Shift Keying). As a phase of each symbol in the in-phase component-quadrature component plane (IQ plane), 4 types of "00, 01, 10 and 11" are available when each positive component is represented by "0" and each negative component is represented by "1".

In addition, the symbol configurations of slots in control channel signal 1 and control channel signal 2 are the same as those in FIG. 5 and FIG. 6 respectively. For example, it is assumed that the phase of the symbol spread with only the short spreading code SC0 in control channel 1 is "00". And, for example, it is assumed that in control channel signal 2, the phase of the symbol spread with only the short spreading code SCm in Slot 0 is "11", and the phases of the symbols spread with only the short spreading code SCm in Slot 2, Slot 4 and Slot 6 are "00".

Mobile station 4 acquires the synchronization of the long spreading code and the synchronization of the switching timing of reverse and forward link according to the initial synchronization method explained in the first embodiment. Then mobile station 4 examines a time sequence pattern of phases in the I-Q plane of symbols spread with only the short spreading codes in control channel signal 1 and control channel 2 each slot. When mobile station 4 detects slots having a pattern in which the phases of control channel signal 1 and control channel signal 2 are provided according to the order of inverse phase, same phase, same phase and same phase, mobile station 4 recognizes the head slot of the slots as first slot, then identifies the head of the slot as a head of transmission frame.

According to the above manner, it is possible to acquire the synchronization of the transmission frame, by using the symbol in the control channel spared with the code in which the long spreading code and the short spreading code are multiplied with no information transmitted from a base station on the synchronization of transmission frame.

In other words, by providing the symbol spread with only the short spreading code at a part of the control channel signal to transmit control information except for the initial synchronization acquisition, it is possible to acquire the synchronization of the long spreading code, the synchronization of the switching timing of reverse and forward link and the synchronization of transmission frame, thereby allowing achieving of the initial synchronization method in which the decrease of frequency utilization efficiency due to the initial synchronization acquisition is suppressed.

As described above, according to the second embodiment, in the CDMA/TDD radio communication system in which the short spreading code and the long spreading code are multiplied to use, symbols spread with only the short spreading codes are provided at a certain interval in a unit frame. By detecting the symbols spread with only the short spreading codes, it is possible to acquire the synchronization of the long spreading code, the synchronization of the switching of reverse and forward link and the synchronization of the transmission frame. As a result, in the CDMA/TDD radio communication system, the frequency utilization efficiency is improved.

(Third Embodiment)

FIG. 9 is a diagram illustrating a configuration of a phase pattern of pilot symbols in a control channel to explain an initial synchronization method in the CDMA/TDD communication system according to the third embodiment of the present invention. FIG. 9A illustrates patterns of the case where one frame is divided to 8 slots and Slots 0,2,4 and 6 are assigned to a forward link, FIG. 9B illustrates patterns of the case where one frame is divided to 16 slots and Slots 0,2,4,6,8,10,12 and 14 are assigned to the forward link, and FIG. 9C illustrates patterns of the case where one frame is divided to 16 slots and Slots 0,2,4,6,8,10,12,14,18,20,22,24, 26,28 and 30 are assigned to the forward link.

At this time, mobile station 4 can acquire the synchronization of the long spreading code and the synchronization of switching timing of reverse and forward link by the initial synchronization method explained in the first embodiment. However mobile station 4 has not recognized the slot number yet and has not acquired the synchronization of the transmission frame.

This embodiment describes about a method to acquire the synchronization of the transmission frame by using patterns of phases in the I-Q plane of pilot symbols among symbols spread with a code in which a short spreading code and a long spreading code are multiplied.

It is assumed that the modulation system is QPSK modulation in the same manner as the second embodiment. As a phase of each symbol in the I-Q plane, 4 types of "00, 01, 10 and 11" are available when each positive component is represented by "0" and each negative component is represented by "1". The symbol configurations of slots in control channel signal 1 and control channel signal 2 are the same as those in FIG. 3 and FIG. 4 respectively.

Base stations 1 to 3 transmit pilot symbols in each slot of control channel signal 1 according to the patterns illustrated in FIG. 9A. Mobile station 4 acquires the synchronization of the long spreading code and the synchronization of the switching timing of reverse and forward link according to the initial synchronization method explained in the first embodiment, then despreads control channel signal 1 with the code in which the long spreading code and the short spreading code are multiplied.

When the patterns of pilot symbols are the same as those illustrated in FIG. 9A, mobile station 4 compares the phases of the first symbol and the second symbol with the phases of the third symbol and the fourth symbol to judge the patterns of pilot symbols. Thus, the slots are identified as Slot 0, Slot 2, Slot 4 and Slot 6. In other words, it is possible to acquire the synchronization of transmission frame.

Also in the case of patterns illustrated in FIG. 9B and FIG. 9C, in the same manner as the case where one frame is divided to 8 slots, mobile station 4 can acquire the synchronization of transmission frame by judging the patterns of pilot symbol of each slot to identify the slot number.

This embodiment explains about the case where the phase patterns of the first symbol and the second symbol of pilot symbols are all "00". However it is preferable to use any pattern for the first symbol and the second symbol when the phase patterns differ each slot. In addition, it is preferable to apply the method of this embodiment with the method to acquire synchronization of transmission frame described in the second embodiment.

As described above, since the different pattern is provided each slot of pilot symbols in the symbols spread with the code in which the long spreading code and the short spreading code are multiplied in the control channel, it is possible to acquire the synchronization of transmission frame by detecting one slot. Further the detection of a plurality of slots allows improving of the reliability of the initial synchronization acquisition.

As described above, according to the third embodiment, in the CDMA/TDD radio communication system in which the short spreading code and the long spreading code are multiplied to use, symbols spread with only the short spreading codes are provided at a certain interval in a unit frame. By detecting the symbols spread with only the short spreading codes, it is possible to acquire the synchronization of the long spreading code and the synchronization of the switching of reverse and forward link. Further by detecting symbols spread with the code in which the long spreading code and the short spreading code are multiplied, it is possible to achieve the initial synchronization method in which the acquisition of the frame synchronization is performed. As a result, in the CDMA/TDD radio communication system, the frequency utilization efficiency is improved.

(Fourth Embodiment)

The first embodiment to the third embodiment describe about the case where, as a short spreading code to spread symbols to be spread with only a short spreading code in slots in one frame, short spreading code SC0 that is common in the system is used in control channel signal 1, and short spreading codes SC1 to SC15 are used in control channel signal 2. The fourth embodiment of the present invention describes about the case where a configuration of short spreading codes SC1 to SC15 in a frame is provided according to a predetermined pattern, where short spreading codes SC0 to SC15 are also used in control channel signal 2 to spread symbols to be spread with only the short spreading code in slots in the frame.

In the case of detecting the long spreading code timing or the slot timing, in the same manner as the first embodiment to the third embodiment, as the first step, the despreading processing is performed to the control channel signal 1 using short spreading code SC0 to detect symbols with high correlation. The symbols are spread with only the short spreading code, and suggest candidate symbols for a head of the long spreading code.

Next, as the second step, the despreading processing is performed to the symbols with high correlation using short spreading codes SC1 to SC15 to detect the correlation values. These correlation values are stored in a memory. A plurality of candidate symbols for the head of the long spreading code are present in one frame, in this case four candidate symbols are present in one frame. The four candidate symbols in the frame each is spread with the same or different short spreading code. In other words, the four candidate symbols in the frame are spread with short spreading codes that are provided in the frame according to a configuration based on the predetermined pattern.

For example, in code pattern #1, the short spreading codes in the frame are all the same SC1. This case of code pattern #1 corresponds to the cases of the first embodiment to the third embodiment. In code pattern #2, the short spreading codes in the frame are SC1 (Slot0), SC2 (Slot2), SC1 (Slot4) and SC2 (Slot6). In code pattern #3, the short spreading codes in the frame are SC1 (Slot0) , SC2 (Slot2), SC1 (Slot4) and SC3 (Slot6) In code pattern #4, the short spreading codes in the frame are SC1 (Slot0), SC2 (Slot2), SC3 (Slot4) andSC1 (Slot6), as shown in FIG. 10A.

Accordingly, with respect to the four candidate symbols in the frame, the sum of the correlation values is calculated each code pattern, and the code pattern with the maximum sum value is identified as the code pattern for the frame. In other words, in code pattern #1, the correlation values obtained by despreading with SC1, SC1, SC1 and SC1 are summed. In code pattern #2, the correlation values obtained by despreading with SC1, SC2, SC1 and SC2 are summed. In code pattern #3, the correlation values obtained by despreading with SC1, SC2, SC1 and SC3 are summed. In code pattern #4, the correlation values obtained by despreading with SC1, SC2, SC3 and SC1 are summed. The code pattern with the maximum sum value among thus obtained sum values is identified as the short code pattern for the frame. As the code pattern is identified, a value of k (5 to 9) is decided according to the number of the identified code pattern. In this case, a table illustrated in FIG. 10B is used. It is thereby decided that the symbol spread with only the short spreading code is the kth symbol. The timing of switching reverse link and forward link is thus obtained.

Herein, in the cases of code patterns #3 and #4, since the same code sequence is not repeated in the frame, it is possible to acquire the synchronization of the frame timing according to the above-mentioned two steps. Accordingly, it is not necessary to perform the below fourth step.

As the third step, the despreading processing is performed to the candidate symbols for the head of the long spreading code in the forward link using the code in which the long spreading code and the short spreading code are multiplied so as to detect the head symbol of the long spreading code in the candidate symbols.

Finally, as the fourth step, the short spreading code is multiplied by the long spreading code LC at the timing of the long spreading LC according to exclusive-OR to obtain the multiplied code, with which the despreading processing is performed to received signals. Candidates of the head of the long spreading code are decode to judge the frame timing. In the manner described above, the use of the code patter in one frame also enables the apparatus to acquire the synchronization of the long spreading code, the synchronization of switching of reverse and forward link, and the synchronization of transmission frame timing, thereby allowing reducing of the synchronization acquisition time.

(Fifth Embodiment)

Figure 11:
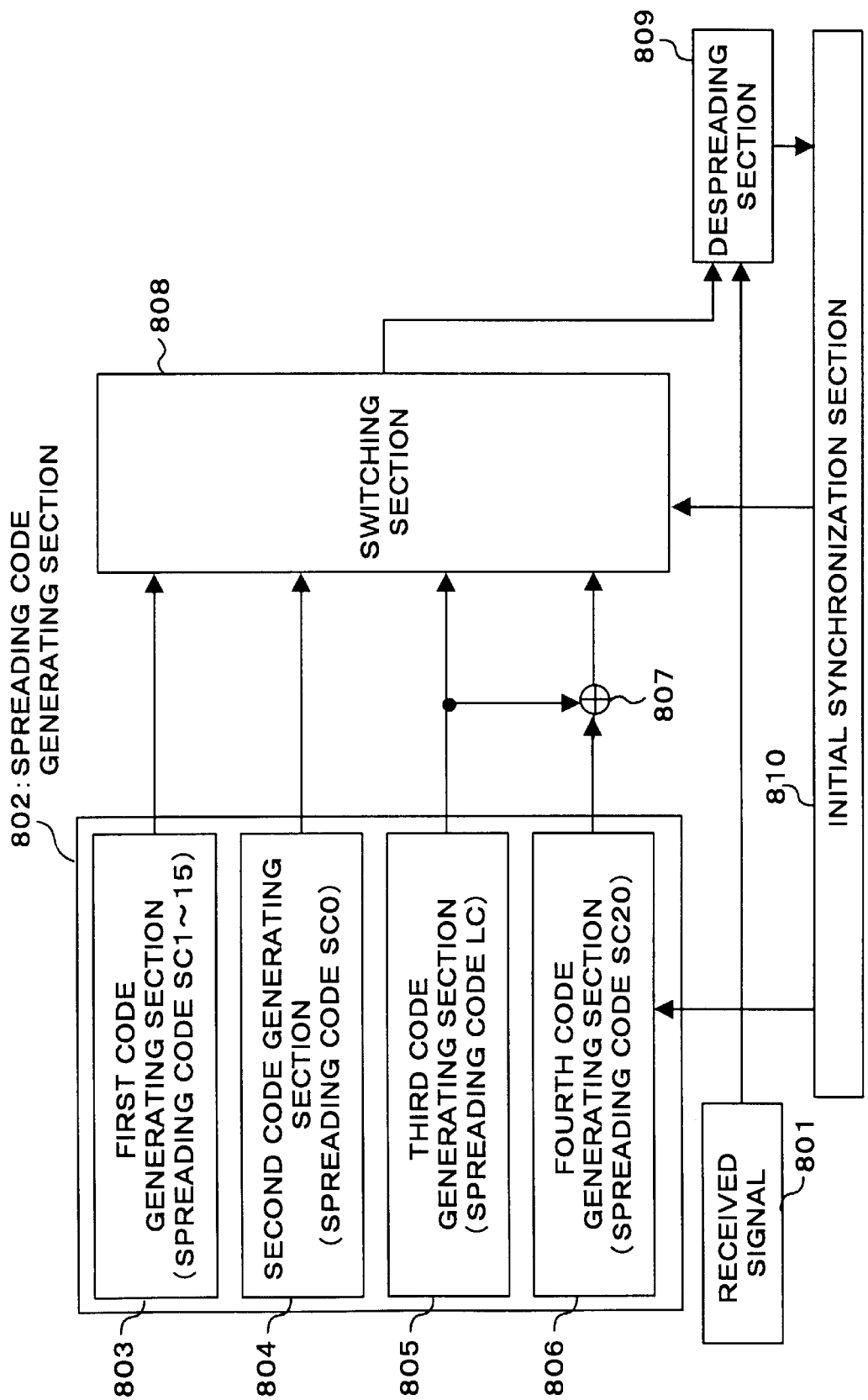
FIG. 11 is a block diagram of an initial synchronization section of a transmission and reception apparatus in the CDMA/TDD radio communication system according to the fifth embodiment of the present invention.

FIG. 11 is a block diagram of an initial synchronization section in a radio communication apparatus in the CDMA/TDD radio communication system according to the fifth embodiment of the present invention. In addition, the radio communication apparatus in this embodiment is a mobile station (communication terminal apparatus). And, antennas, radio transmission and reception sections, modulating and demodulating sections and other devices provided in the CDMA radio communication apparatus are the same as those in an ordinary radio communication apparatus, therefor those are not illustrated in FIG. 11.

In FIG. 11, received signal 801 is in dispersing section 809 despread with a spreading code generated in spreading code generating section 802. Spreading code generating section 802 includes first code generating section 803 for generating short spreading codes SC1 to SC15, second code generating section 804 for generating short spreading code SC0, third code generating section 805 for generating long spreading codes LC, and fourth code generating section 806 for generating short spreading code SC20 to be multiplied by the long spreading code.

Exclusive OR section 807 multiplies a long spreading code of each candidate timing by the short spreading code. Switching section 808 switches spreading codes generated in the spreading code generating section. Despreading section 809 detects the correlation of a received signal with the spreading code. Initial synchronization section 810 acquires the initial synchronization using the correlation value obtained in despreading section 809.

In the configurations described above, it is assumed that base stations 1 to 3 transmit control channel signal 1 and control channel signal 2 explained in the first embodiment to the third embodiment.

As the first step, initial synchronization section 810 instructs switching section 808 to output short spreading code SC0 generated in second code generating section 804 to despreading section 809. According to this instruction, short spreading code SC0 is output to despreading section 809.

Despreading section 809 despreads received signal 801 with short spreading code SC0 by detecting the correlation of each symbol in a slot at each chip timing. The timing, by which the maximum correlation value in the obtained correlation values is obtained, is the head position of the symbol spread with only short spreading code SC0. And, the head position of a symbol just after the symbol in the slot is a candidate of the head position of the long spreading code. It is preferable to integrate the correlation value at each chip timing for a plurality of slots to obtain the integration value if necessary, which improves the reliability of detection of the head symbol position.

Next, as the second step, initial synchronization section 810 instructs spreading code generating section 802 to sequentially generate short code spreading codes SC1 to SC15 in first code generating 803 at the same symbol timing as that of the symbol spread with only the above short spreading code SC0. Also initial synchronization section 810 instructs switching section 808 to sequentially output short spreading codes SC1 to SC15 generated in first code generating section 803 to despreading section 809. According to the instruction, short spreading codes SC1 to SC15 are output to despreading section 809 sequentially.

Despreading section 809 detects the correlation of the symbol spread with only short spreading code SC0 in received signal 801 with each of short spreading codes SC1 to SC15 sequentially. It is preferable to integrate the correlation of each code a plurality of times to obtain the integration value if necessary, which improves the reliability of the detection of short spreading code SCm. The spreading code with the maximum correlation value among the obtained correlation values is detected as short spreading code SCm. As explained in the first embodiment, the symbol spread with only short spreading code SCm is the m+4th symbol in the slot, thereby the head position of the slot is decided. In other words, it is possible to obtain the synchronization of switching timing of reverse and forward link. Thereby, it is possible to despread the symbol other than the symbol despread with the short code only.

Next, as the third step, initial synchronization section 810 instructs spreading code generating section 802 to sequentially generate long spreading codes LC in third code generating section 805 according to the already obtained candidate positions for timings of long spreading code. Also initial synchronization section 810 instructs switching section 808 to output signals that are generated in exclusive OR section 807 by multiplying long spreading code LC generated in third code generating section 805 by short spreading code SC20 generated in fourth code generating section 806 to despreading section 809. According to the instruction, long spreading code LC and short spreading code SC20 are output to despreading section 809.

Despreading section 809 despreads received signal 801 with each code in which long code spreading LC of each candidate timing and short spreading code SC20 are multiplied, and detects the correlation sequentially. It is preferable to obtain the integration value by integrating the correlation value of the code of each candidate timing a plurality of times to improve the reliability of the candidate timing detection. The candidate timing, by which the maximum correlation value in the obtained correlation values is obtained, is detected as the timing for the long spreading code LC, thus the synchronization of the long spreading code LC timing is acquired.

Finally, as the fourth step, initial synchronization section 810 instructs spreading code generating section 802 to generate long spreading code LC in third code generating section 805 at the timing of long spreading code LC. Also initial synchronization section 810 instructs switching section 808 to output signals that are generated in exclusive OR section 807 by multiplying long spreading code LC generated in third code generating section 805 by short spreading code SC20 generated in fourth code generating section 806 to despreading section 809. According to this instruction, the signals in which long spreading code LC and short spreading code SC20 are multiplied are output to despreading section 809 via switching section 808.

Despreading section 809 despreads received signal 801 with the code in which long spreading code LC and short spreading code SC20 are multiplied, and detects the correlation. Despreading section 809 obtains phases in the I-Q plane using the detected correlation values, and judges the phase patterns of pilot symbols.

It is preferable to judge phases of pilot symbols of a plurality of frames to improve the judgement reliability. The slot number is decided when the pilot symbol pattern is conformed (to the known pattern), thereby making it possible to acquire the synchronization of transmission frame timing.

It is thus possible to despread both of symbols spread with the code in which long spreading code LC and short spreading code SC20 are multiplied and symbols spread with only short spreading code SC20.

As described above, according to the fifth embodiment, in the CDMA/TDD radio communication system, a mobile station apparatus comprises a processing section for despreading with the code in which the long spreading code and the short spreading code are multiplied, and another processing section for despreading with short spreading code. Then the mobile station apparatus acquires the initial synchronization using the initial synchronization method according to either of the first embodiment to the fifth embodiment. The mobile station apparatus thus reduces the initial synchronization acquisition time, thereby resulting in the radio communication system with high frequency utilization efficiency.

(Sixth Embodiment)

FIG. 12 is a block diagram illustrating a primary configuration of a radio communication apparatus in the CDMA/TDD according to the sixth embodiment of the present invention. In addition, it is assumed that the radio communication apparatus in this embodiment is a base station. And, antennas, radio transmission and reception sections, modulating and demodulating sections and other devices provided in the CDMA radio communication apparatus are the same as those in an ordinary radio communication apparatus, therefor those are not illustrated in FIG. 12.

In FIG. 12, first code generating section 901 generates long spreading code LC. Second code generating section 902 generates short spreading code SC20. Third code generating section 903 generates short spreading code SC0. Fourth code generating section 904 generates short spreading code SC5. Fifth code generating section 905 generates short spreading code SC21. Sixth code generating section 906 generates short spreading code SC22.

Exclusive OR section 907 multiplies long spreading code LC by short spreading code SC20. Exclusive OR section 908 multiplies long spreading code LC by short spreading code SC21. Exclusive OR section 909 multiplies long spreading code LC by short spreading code SC22.

Switching section 910 switches a spreading code of control channel 1. First spreading section 911 and third spreading section 913 spread control channel signal 1. Second spreading section 912 and fourth spreading section 914 spread control channel signal 2. Multiplexing section 915 synthesizes spread signals.

In the configuration described above, first code generating section 901 generates long spreading code LC, second code generating section 902 generates short spreading code 20 to be multiplied by long spreading code LC in exclusive OR section 907. The multiplied code is input to switching section 910.

Third code generating section 903 generates short spreading code SC0 for the symbol to be spread with only the short spreading code. Switching section 910 switches, according to the slot configuration example in FIG. 7, the code in which long spreading code LC and short spreading code SC20 are multiplied to output to first spreading section 911.

Control information 1' including the pilot symbol indicative of a pilot symbol pattern shown in FIG. 9A is input to first spreading section 911. First spreading section 911 spreads control information 1' with the switched spreading code to input to multiplexing section 915.

Fourth code generating section 904 generates short spreading code SC5 according to the slot configuration in FIG. 8 to input second spreading section 912. In this example, since the object symbol is the ninth symbol, fourth code generating section 904 generates short spreading code SC5. Generally, fourth code generating section 904 generates short spreading code SCk−4 when the object symbol is the kth symbol. Second spreading section 912 spreads control information 2' with short spreading code SC5 to input to multiplexing section 915.

Fifth code generating section 905 generates short spreading code SC21. Exclusive OR section 908 multiplies short spreading code SC21 by long spreading code LC to input to third spreading section 913. Third spreading section 913 spreads communication information 1' with the code in which short spreading code SC21 and long spreading code LC are multiplied to input to multiplexing section 915.

Sixth code generating section 906 generates short spreading code SC22. Exclusive OR section 909 multiplies short spreading code SC22 by long spreading code LC to input to fourth spreading section 914. Fourth spreading section 914 spreads communication information 2' with the code in which short spreading code SC22 and long spreading code LC are multiplied to input to multiplexing section 915.

Multiplexing section 915 multiplexes control channel 1, control channel 2, communication channel 1 and communication channel 2 to generate transmission signals. The signal sequence illustrated in FIG. 3 is thus generated.

The above processing makes it possible to reduce the acquisition time of the synchronization of the long spreading code, the synchronization of switching timing of reverse and forward link and the synchronization transmission frame, thereby making it possible to suppress the decrease of frequency utilization efficiency due to the initial synchronization acquisition.

As described above, the sixth embodiment provides the base station apparatus in the CDMA/TDD radio communication system comprising the processing section for transmitting symbols spread with the code in which the long spreading code and the short spreading code are multiplied, and the symbol spread with only the short spreading code in a certain interval, based on the initial synchronization method according to either of the first embodiment to the fourth embodiment, which allows the system to have the reduced acquisition time in the initial synchronization and improved frequency utilization efficiency.

(Seventh Embodiment)

A CDMA/TDD radio communication system according to the seventh embodiment of the present invention is composed of a radio communication apparatus such as the base station illustrated in FIG. 12 that is explained in the sixth embodiment and a radio communication apparatus such as the mobile station illustrated in FIG. 11 that is explained in the fifth embodiment.

In other words, the radio communication system of the seventh embodiment performs the acquisitions of synchronization of the long spreading code, the synchronization of switching timing of reverse and forward link, and the synchronization of transmission frame.

The above processing makes it possible to reduce the acquisition time of the synchronization of the long spreading code, the synchronization of switching timing of reverse and forward link and the synchronization of transmission frame, thereby suppressing the decrease of frequency utilization efficiency due to the initial synchronization acquisition.

As described above, it is possible by the seventh embodiment to achieve the radio communication system comprising the CDMA/TDD radio communication apparatus including the processing section for transmitting symbols spread with the code in which the long spreading code and the short spreading code are multiplied, and the symbol spread with only the short spreading code in a certain interval, based on the initial synchronization method according to either of the first embodiment to the fourth embodiment, and comprising the CDMA/TDD radio communication apparatus including the processing section for despreading using the code in which the long spreading code and the short spreading code are multiplied, and the another processing section for despreading using the short spreading code, to perform the initial synchronization acquisition using the initial synchronization method according to either of the firs embodiment to the fourth embodiment. It is thereby possible to reduce the acquisition time in the initial synchronization and improve the frequency utilization efficiency.

It is apparent as described above to acquire the synchronization of the long spreading code, the synchronization of reverse and forward link switching, and the synchronization of transmission frames by providing the symbols spread with only the short spreading codes and detecting the symbols spread with only the short spreading codes in the CDMA/TDD radio communication system in which the short spreading code and the long spreading code are multiplied to use. It is thereby possible to reduce the acquisition time in the initial synchronization and improve the frequency utilization efficiency.

This application is based on the Japanese Patent Application No. HEI9-345820 filed on Dec. 1, 1997, entire content of which is expressly incorporated by reference herein.

What is claimed is:

1. A radio communication apparatus comprising:
spreading code generating means for generating a first short spreading code that is common in a system, a second spreading code at a same timing as a symbol spread with only said first short spreading code, a long spreading code, and a multiplied code in which the long spreading code and a short spreading code are multiplied;
correlation means for detecting a correlation using only said first short spreading code;
first detecting means for detecting said symbol spread with only said short first spreading code by detecting a symbol with a high correlation value; and
second detecting means for detecting another short spreading code used to notify a timing of switching reverse and forward links, wherein said short spreading code is multiplexed at a same position as said detected symbol.

2. The radio communication apparatus according to claim 1, wherein said apparatus detects the correlation with the second spreading code at the same timing as said symbol spread with only said first short spreading code in a no signal interval provided as a head slot of a transmission frame in a received signal.

3. The radio communication apparatus according to claim 1, wherein said apparatus acquires synchronization of a transmission frame by detecting slots in which a time sequence phase pattern of in-phase component-quadrature component by QPSK modulation of first symbols and second symbols is conformed to a predetermined pattern, wherein said first symbols each spread with only the first spreading code are provided in a control channel synchronized with a head slot of the transmission frame, and have a specific phase of in-phase component-quadrature component by QPSK modulation and, said second symbols each spread with only the second spreading code are provided in another control channel synchronized with the head slot of transmission frame.

4. The radio communication apparatus according to claim 1, wherein said apparatus decides a pattern of pilot symbols in a slot, wherein said pattern differs each slot and said pilot symbols are spread with the multiplied code and provided in a control channel synchronized with a head slot of a transmission frame.

5. The radio communication apparatus according to claim 1, wherein a plurality of the second spreading codes are provided in a transmission frame according to a predetermined code pattern.

6. A mobile station apparatus comprising a radio communication apparatus, said radio communication apparatus having:

spreading code generating means for generating a first short spreading code that is common in a system, a second spreading code at a same timing as a symbol spread with only said first short spreading code, a long spreading code, and a multiplied code in which the long spreading code and a short spreading code are multiplied;

correlation means for detecting a correlation using only said first short spreading code;

first detecting means for detecting said symbol spread with only said first short spreading code by detecting a symbol with a high correlation value; and second detecting means for detecting another short spreading code used to notify a timing of switching reverse and forward links, wherein said short spreading code is multiplexed at a same position as said detected symbol.

7. A radio communication method comprising the steps of:

detecting a correlation using only a short spreading code common in a system;

detecting a symbol spread with only the short spreading code in synchronism with a period of a long spreading code by detecting a symbol with a high correlation value; and detecting another short spreading code used to notify a timing of switching reverse and forward links, wherein said short spreading code is multiplexed at a same position as said detected symbol so as to acquire synchronization of said long spreading code and synchronization of said timing of switching reverse and forward links.

8. The radio communication method according to claim 7, further comprising the steps of:

acquiring synchronization of said long spreading code and synchronization of said timing of switching reverse and forward links by providing a no symbol interval as a head slot of a transmission frame;

detecting said no symbol interval by detecting low correlation; and acquiring synchronization of said transmission frame by using a result obtained by said detecting step.

9. The radio communication method comprising the steps of:

providing first symbols each spread with only a first spreading code in a control channel synchronized with a head slot of the transmission frame, wherein said symbols have a specific phase of in-phase component-quadrature component by QPSK modulation;

providing second symbols each spread with only the second spreading code in a control channel synchronized with the head slot of transmission frame; and acquiring synchronization of a transmission frame by detecting slots in which a time sequence phase pattern of in-phase component-quadrature component by QPSK modulation of first symbols and second symbols is conformed to a predetermined pattern.

10. The radio communication method comprising the steps of:

providing a different pattern of pilot symbols each slot, wherein said pilot symbols are in symbols that are spread with a multiplied code in which the long spreading code and a short spreading code are multiplied and provided in a control channel synchronized with a head slot of a transmission frame; and acquiring synchronization of transmission frame by detecting said symbols spread with the multiplied code.

11. A radio transmission and reception apparatus comprising a transmission apparatus for transmitting a symbol spread with a code in which a long spreading code and a short spreading code are multiplied, and a symbol spread with only a short spreading code at a predetermined interval, and a reception apparatus for despreading using the code in which the long spreading code and the short spreading code are multiplied, and further despreading using the short spreading code.

* * * * *

UNITED STATES PATENT AND TRADEMARK OFFICE
CERTIFICATE OF CORRECTION

PATENT NO. : 6,522,625 B1
DATED : February 18, 2003
INVENTOR(S) : M. Hayashi et al.

It is certified that error appears in the above-identified patent and that said Letters Patent is hereby corrected as shown below:

<u>Title page,</u>
Item [56], References Cited, the following OTHER DOCUMENT was omitted and should be included: -- K. HIGUCHI et al., published by Technical Report of IEICE. DSP96-11, RCS96-122 (1997-01) at pages 57-63, entitled "Fast Cell Search Algorithm Using Long Code Masking in DS-CDMA Asynchronous Cellular System," along with an English Language abstract. --.

Signed and Sealed this

Fifteenth Day of July, 2003

JAMES E. ROGAN
*Director of the United States Patent and Trademark Office*